JOSEPH R. AMES.
Improvement in Stump-Extractor.

No. 126,370.  Patented May 7, 1872.

Witnesses:  Inventor:

126,370

UNITED STATES PATENT OFFICE.

JOSEPH R. AMES, OF CLEARFIELD COUNTY, PENNSYLVANIA.

IMPROVEMENT IN STUMP-EXTRACTORS.

Specification forming part of Letters Patent No. 126,370, dated May 7, 1872.

I, JOSEPH R. AMES, of Clearfield county and State of Pennsylvania, have invented certain Improvements in Stump-Extractors, of which the following is a specification:

The nature of my invention relates to the application of rope and pulleys, all of which are attached to axles and mounted on wheels; and to one of these axles is attached a tongue, to which I apply a team, for convenience in transportation; and when my machine is at the proper place I apply my team to the rope, which passes around the pulleys, thereby increasing the power.

Figure 1:
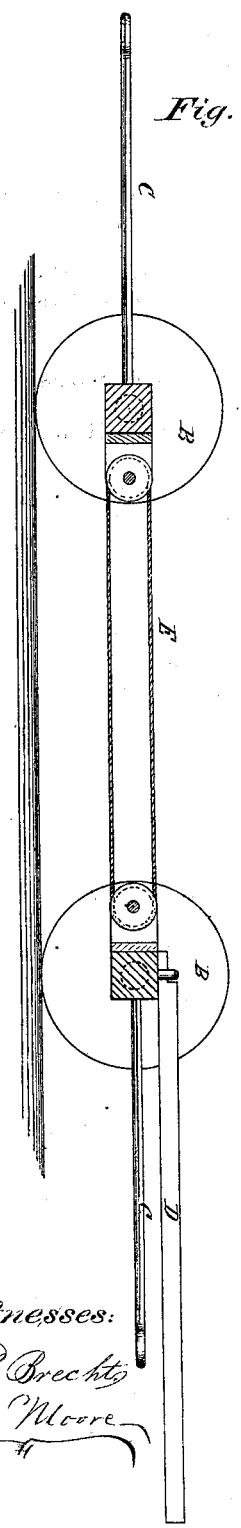
Figure 2:
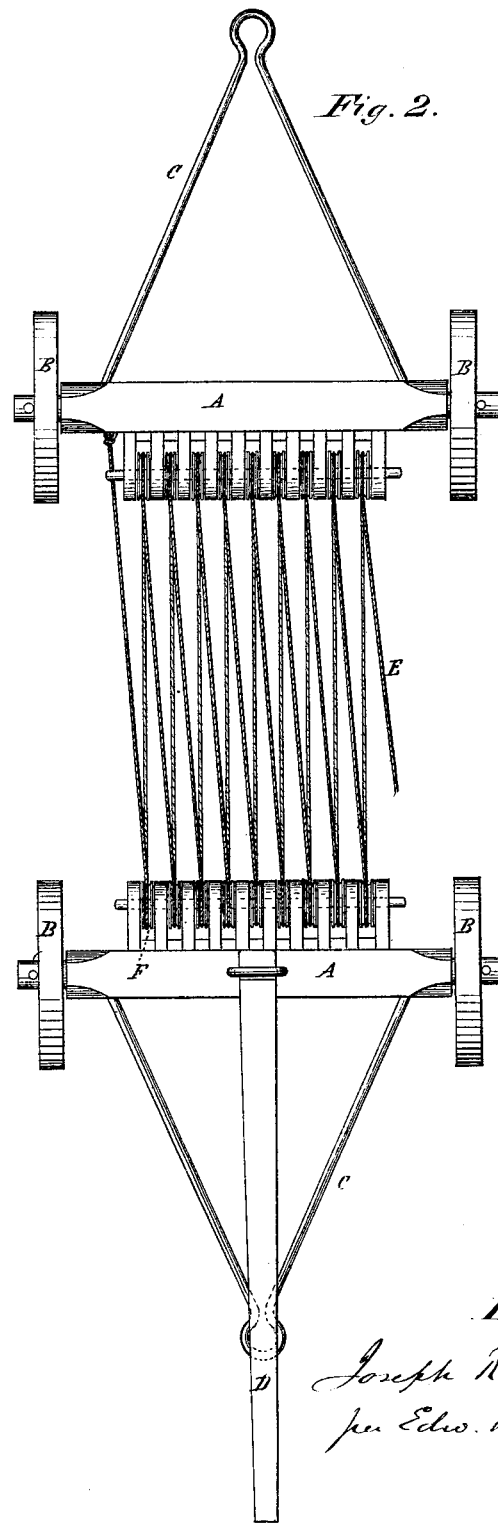

Figure 1 is a view of my machine when ready for use. Fig. 2 is a portion of my machine, showing wheels, ends of axles, and two strands of rope.

A represents the axles, B the wheels, C the hounds, D the tongue, E the rope, F the pulleys; and

What I claim, is—

A stump-extractor, constructed as herein described.

JOSEPH R. AMES.

Witnesses:
E. B. CLEMSEN,
ISAAC MARKLE.